(12) United States Patent
Yamada et al.

(10) Patent No.: US 7,143,969 B2
(45) Date of Patent: Dec. 5, 2006

(54) DECLADDING METHOD AND DECLADDING DEVICE FOR SPENT NUCLEAR FUEL REPROCESSING

(75) Inventors: Seiya Yamada, Ibaraki-ken (JP); Masayuki Takeuchi, Ibaraki-ken (JP); Tsutomu Koizumi, Ibaraki-ken (JP); Kazumasa Suyama, Nagasaki (JP); Kazuo Takami, Nagasaki (JP); Teruo Hara, Nagasaki (JP)

(73) Assignee: Japn Nuclear Cycle Development Institute, Ibaraki-Ken (JP)

( * ) Notice: Subject to any disclaimer, the term of this patent is extended or adjusted under 35 U.S.C. 154(b) by 56 days.

(21) Appl. No.: 10/885,715

(22) Filed: Jul. 8, 2004

(65) Prior Publication Data
US 2005/0018804 A1 Jan. 27, 2005

(30) Foreign Application Priority Data
Jul. 9, 2003 (JP) ............................. 2003-194325
Aug. 1, 2003 (JP) ............................. 2003-285154

(51) Int. Cl.
*B02C 9/04* (2006.01)
(52) U.S. Cl. .......................................... 241/69; 241/73
(58) Field of Classification Search .................... 241/3, 241/69, 73, 79.1, 236
See application file for complete search history.

(56) References Cited

U.S. PATENT DOCUMENTS

| | | | | |
|---|---|---|---|---|
| 4,056,052 A | * | 11/1977 | Weil et al. ...................... 100/39 |
| 5,299,744 A | * | 4/1994 | Garmater ....................... 241/19 |
| 5,452,860 A | * | 9/1995 | Williams ....................... 241/78 |
| 5,522,554 A | * | 6/1996 | Blank et al. ................... 241/23 |
| 5,975,442 A | * | 11/1999 | Purser ....................... 241/24.14 |
| 6,390,396 B1 | * | 5/2002 | Takano et al. ................. 241/30 |
| 6,481,650 B1 | * | 11/2002 | Mori ....................... 241/24.15 |
| 6,527,206 B1 | * | 3/2003 | Wuebbels et al. ............. 241/19 |

FOREIGN PATENT DOCUMENTS

JP 2002-40189 2/2002

OTHER PUBLICATIONS

Takeuchi Masayuki et al., Development of Mechanical Decladding Method for Fast Reactor Fuel Reprocessing (3)—Preliminary Test for Fuel Separation by Magnetic Separation Method -, Autumn General Meeting, 2002, Atomic Energy Society of Japan, Sep. 14 to 16, 2002 at Iwaki Meisei University, p. 525, with English abstract.

(Continued)

*Primary Examiner*—Faye Francis
(74) *Attorney, Agent, or Firm*—Wenderoth, Lind & Ponack, L.L.P.

(57) ABSTRACT

A decladding device of spent nuclear fuel easily and efficiently removes fuel pins from the spent nuclear fuel. Spent nuclear fuel pins P, made of austenitic stainless steel, and in which the spent nuclear fuel is filled, are fed by a feeder 7 one by one or by a unit of several pins and finely sheared into fragments by a shredder 1 having plural rotating blades 4, 5 so that fragments are of a size of 1 to 2 mm or less. The sheared fragments are separated into a fuel pin portion and a nuclear fuel portion by a magnetic separator 20. The magnetic separator 20 comprises a vibration feeder 27 feeding the sheared fragments and is arranged below the shredder 1. Without using a dissolving liquid of nitric acid, decladding is done and the spent nuclear fuel can be efficiently obtained.

8 Claims, 5 Drawing Sheets

OTHER PUBLICATIONS

Seiya Yamada et al., "Development of Mechanical Decladding Method for Fast Reactor Fuel Reprocessing (2)", Autumn General Meeting, 2002, of the Atomic Energy Society of Japan, Sep. 14 to 16, 2002 at Iwaki Meisei University w/partial English translation.

* cited by examiner

DECLADDING METHOD AND DECLADDING DEVICE FOR SPENT NUCLEAR FUEL REPROCESSING

BACKGROUND OF THE INVENTION

1. Field of the Invention

The present invention relates to a decladding method and a decladding device for removing cladding tubes (fuel pins) from spent nuclear fuel so that fine fragments of the spent nuclear fuel are obtained.

2. Description of the Prior Art

A fast breeder reactor uses a multiplicity of fuel pins as a nuclear fuel assembly and, therefore, it is necessary to take out the spent nuclear fuel from the fuel pins.

In order to remove the fuel pins from the spent nuclear fuel, prior art examples are disclosed, for example, by the Japanese laid-open patent application 1994-43288 and a publication, "Preliminary Scripts, pages 524 and 525, Autumn General Meeting, 2002, of the Atomic Energy Society of Japan, Sep. 14 to 16, 2002, at the Iwaki Meisei Univ.". Therein, a method is employed in which the spent nuclear fuel assembly is sheared and the spent nuclear fuel is dissolved by nitric acid so that the nuclear fuel is separated from the fuel pins.

In order to shear the nuclear fuel assembly, a large size shearing machine having a hydraulic apparatus is needed. Also, the shearing is of a press-cutting type so that no fine shearing can be done, and shearing of a length size of only 2 to 4 cm can be done. Thus, it is not easy to take out the spent nuclear fuel from the sheared fuel pins.

In the prior art method of dissolving the spent nuclear fuel by nitric acid for separation, as mentioned above, a large amount of nitric acid is needed and also nitrogen oxides (NOx) are generated from the nitric acid by dissolving the spent nuclear fuel. Further, a denitration apparatus must be added to the facility for recovering the nitric acid. Moreover, in order to recover the nitric acid, a large amount of expense is incurred.

Thus, in reprocessing the spent nuclear fuel, a technology to efficiently remove the fuel pins from the spent nuclear fuel is desired.

SUMMARY OF INVENTION

It is therefore an object of the present invention to provide a decladding method and a decladding device of spent nuclear fuel that does not use a large size shearing machine but can easily and efficiently separate fuel pins from the spent nuclear fuel so as to enable obtaining fine fragments of the nuclear fuel.

In order to solve the above-mentioned object, the present invention employs a decladding method of spent nuclear fuel which finely shears a plurality of spent nuclear fuel pins, made of austenitic stainless steel, in which the spent nuclear fuel is filled into fragments so that a main portion of the fragments is of a size of 1 to 2 mm or less, and separates the fragments so obtained into a fuel pin portion and a spent nuclear fuel portion by magnetic separation.

According to this decladding method of spent nuclear fuel based on the present invention, by finely shearing the spent nuclear fuel pins made of austenitic stainless steel, in the sheared portions of fuel pins of the spent nuclear fuel pins, the austenitic structure of the stainless steel is partially changed to a martensitic structure. Hence, by carrying out the magnetic separation of the sheared fragments, the fuel pins and the spent nuclear fuel can be separated from each other so that the fuel pins are removed and the fine fragments of the spent nuclear fuel are taken out. Thereby, an expensive dissolving liquid such as nitric acid or the like, as used in the prior art case, is not needed to be used for removing the fuel pins, and the spent nuclear fuel can be easily and efficiently taken out.

In the fragments of the fuel pins, there is a tendency that the smaller the particle size, the higher the magnetizing rate, and the larger the particle size, the lower the magnetizing rate. However, if the metal fragments of a very small particle size are to be obtained, there is a problem in that abrasion or wear of the shearing device becomes large. But according to the decladding method of the present invention, by finely shearing into fragments the spent nuclear fuel pins made of austenitic stainless steel, in which the spent nuclear fuel is filled as it is, so that a main portion of the fragments is of the size of 1 to 2 mm or less, the metal fragments are changed to have a ferromagnetic nature of a high magnetizing rate. Magnetic separation thereby becomes applicable and the metal fragments and the spent nuclear fuel can be easily and efficiently separated from each other.

In this way, according to the decladding method of the present invention, the cladding of the spent nuclear fuel can be easily removed and the fuel can be efficiently recovered without using a dissolving liquid such as nitric acid.

In the above-mentioned decladding method of the present invention, it is preferable that the spent nuclear fuel pins are disassembled from the nuclear fuel assembly and the shearing of the spent nuclear fuel pins is carried out with respect to each one pin or each one unit of several pins of the spent nuclear fuel pins by using a rotary type cutter constructed by a plurality of blades and a screen having a plurality of holes. The spent nuclear fuel pins are thereby finely sheared and the sheared fragments of the spent nuclear fuel can be efficiently separated from the fuel pins.

Also, in order to achieve the above-mentioned object, the present invention provides a decladding device of spent nuclear fuel comprising a shearing device shearing a plurality of spent nuclear fuel pins into fragments and a magnetic separator magnetically separating the fragments obtained by the shearing device. The shearing device comprises a rotary type cutter constructed by a plurality of blades arrayed in parallel with each other and a screen retaining the fragments until the fragments are finely sheared so that a main portion of the fragments is of a size of 1 to 2 mm or less.

According to the decladding device of the present invention, by using the plurality of blades arrayed in parallel with each other in the rotary type cutter, the spent nuclear fuel pins are finely sheared into fragments and the sheared fragments are retained on the screen so as to be repeatedly sheared so that the main portion of the fragments is of the size of 1 to 2 mm or less. The screen has a plurality of holes of a diameter adjusted to meet the mentioned size of the fragments. That is, the fragments sheared to the size of 1 to 2 mm or less pass through the holes of the screen to be discharged. Then, by the magnetic separator, the fragments of the nuclear fuel and those of the fuel pins having the martensitic structure are easily separated from each other. Thereby, the clad of the spent nuclear fuel is efficiently removed and fine fragments of the spent nuclear fuel can be obtained.

In the decladding device of the present invention, if the construction is made such that the magnetic separator is arranged below the shearing device, the fragments of the spent nuclear fuel pins finely sheared by the shearing device fall down on the magnetic separator arranged below the shearing device and thereby the fragments can be appropriately supplied to be continuously processed.

In the decladding device of the present invention, if the shearing device is constructed to further comprise a feeder feeding the spent nuclear fuel pins one by one or by a unit of several pins of the spent nuclear fuel pins, then the fuel pins in which the spent nuclear fuel is filled as it is can be supplied so that the fuel pins are sheared in a desired fragment state and separation of the spent nuclear fuel and the fuel pins can be efficiently carried out by the magnetic separation.

DESCRIPTION OF THE PREFERRED EMBODIMENTS

Herebelow, the present invention will be described more concretely based on embodiments according to the present invention with reference to the appended drawings.

First Embodiment

Figure 1:
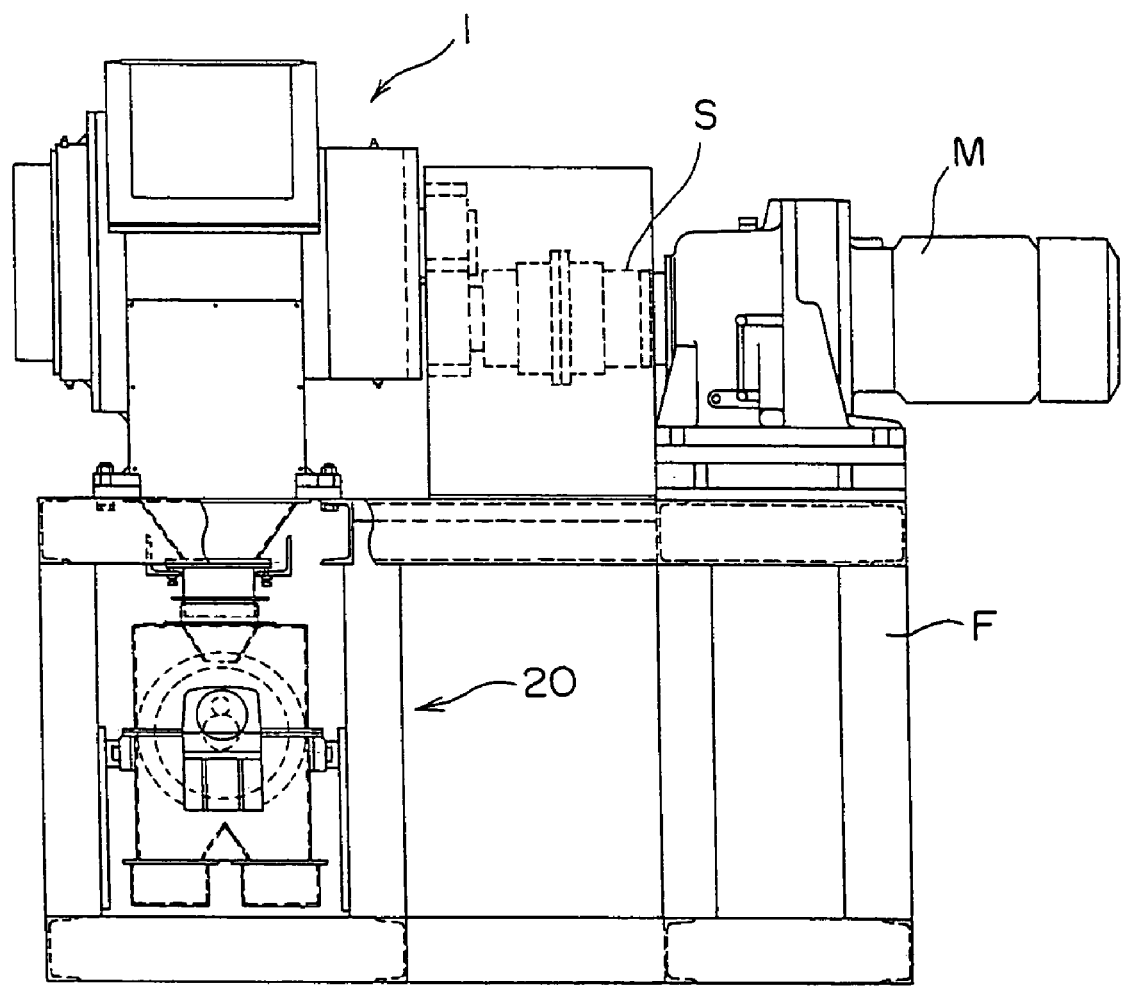
FIG. 1 is a side view showing an entire construction of a decladding device of spent nuclear fuel of a first embodiment according to the present invention.

A decladding device of spent nuclear fuel of a first embodiment of the present invention will be described with reference to FIGS. 1 to 4. In FIG. 1 showing an entire construction of the decladding device of spent nuclear fuel, numeral 1 designates a shredder as a shearing device that finely shreds spent nuclear fuel pins, made of austenitic stainless steel, in which the spent nuclear fuel is filled as it is. The shredder 1 comprises a rotary type cutter constructed by a plurality of blades and, together with a motor M as a rotational drive unit of the shredder 1, is mounted on a frame F. Letter S designates a rotating shaft that transmits a rotational drive force of the motor M to the shredder 1.

Numeral 20 designates a magnetic separator arranged below the shredder 1. The spent nuclear fuel pins are finely shredded by the shredder 1 so that shredded fragments thereof fall down on the magnetic separator 20. The magnetic separator 20 receives the shredded fragments and separates them into a fuel pin portion and a spent nuclear fuel portion.

Figure 2:
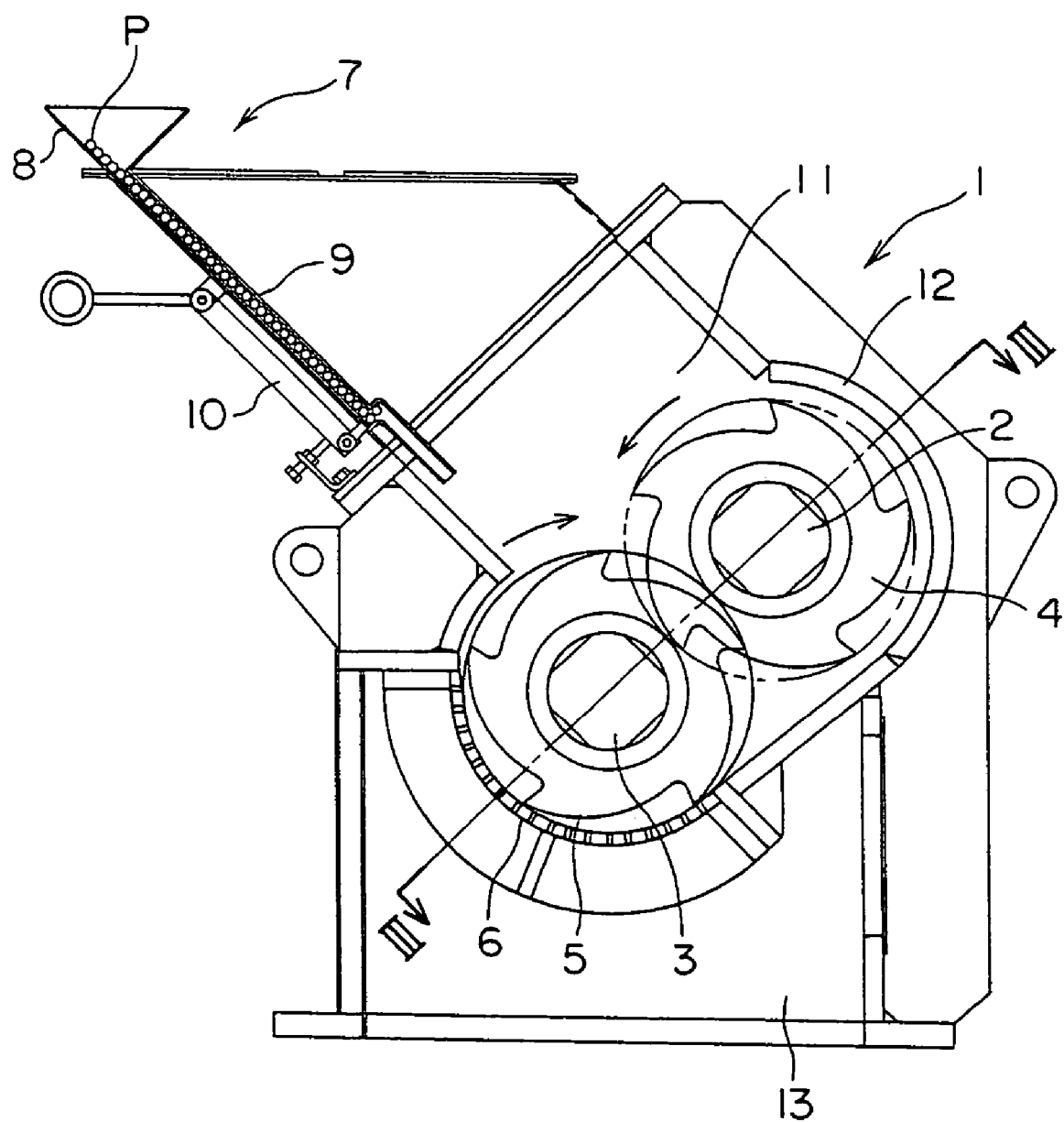
FIG. 2 is a cross sectional side view of a shredder used in the decladding device of FIG. 1.
Figure 3:
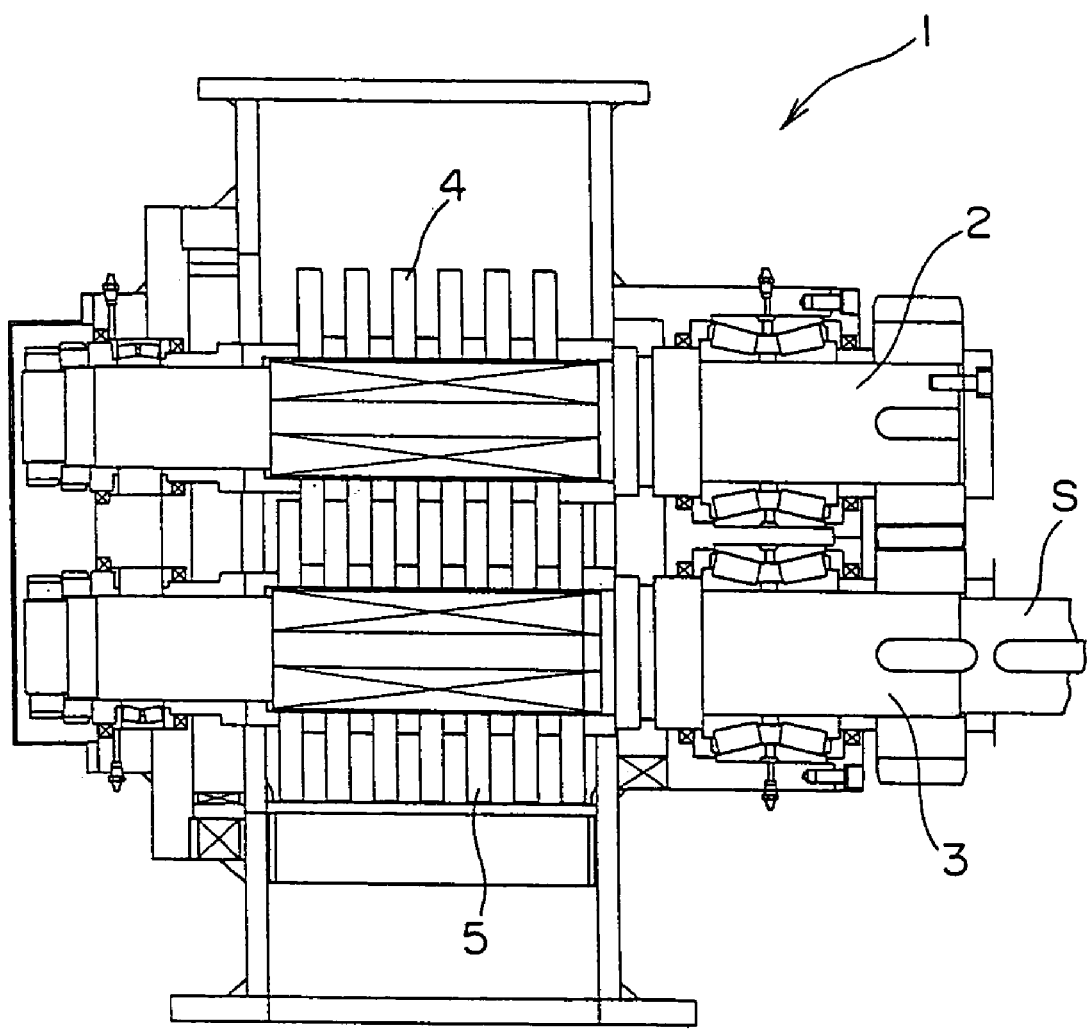
FIG. 3 is a cross sectional view taken on line III—III of FIG. 2.

Structure of the shredder 1 will be described with reference to FIGS. 2 and 3. In the shredder 1 comprising the rotary type cutter, two rotating shafts 2, 3 are arranged horizontally in parallel with each other and supported rotatably around respective bearings. The rotating shaft 2 has six blades 4 fitted thereto and arranged in a shaft lengthwise direction with a predetermined interval maintained between each of the blades 4.

The other rotating shaft 3 has seven blades 5 fitted thereto and arranged in the shaft lengthwise direction with a predetermined interval being maintained between each of the blades 5. The blades 4, 5 are assembled together so that they are alternately fitted in between each other so as to be partially lapped one on another and are rotated in the reverse directions to each other as shown by arrows in FIG. 2.

Numeral 6 designates a screen having a multiplicity of holes of a diameter of several mm bored therein. The screen 6 is assembled relative to the blades 5 so that a gap of several mm is formed between the screen 6 itself and a rotational locus of an outer apex end of each of the blades 5.

Numeral 7 designates a feeder that functions to supply the spent nuclear fuel pins to the blades 4, 5. The feeder 7 is constructed comprising a hopper 8 that receives the spent nuclear fuel pins P disassembled from a nuclear fuel assembly, a supply passage 9 and a throwing mechanism 10 of the spent nuclear fuel pins P. The blades 4, 5 of the shredder 1 are arranged in a shredding chamber 11. The shredding chamber 11 is surrounded by a casing 12 and communicates with a shredded fragment falling port 13 via the screen 6.

Figure 4:
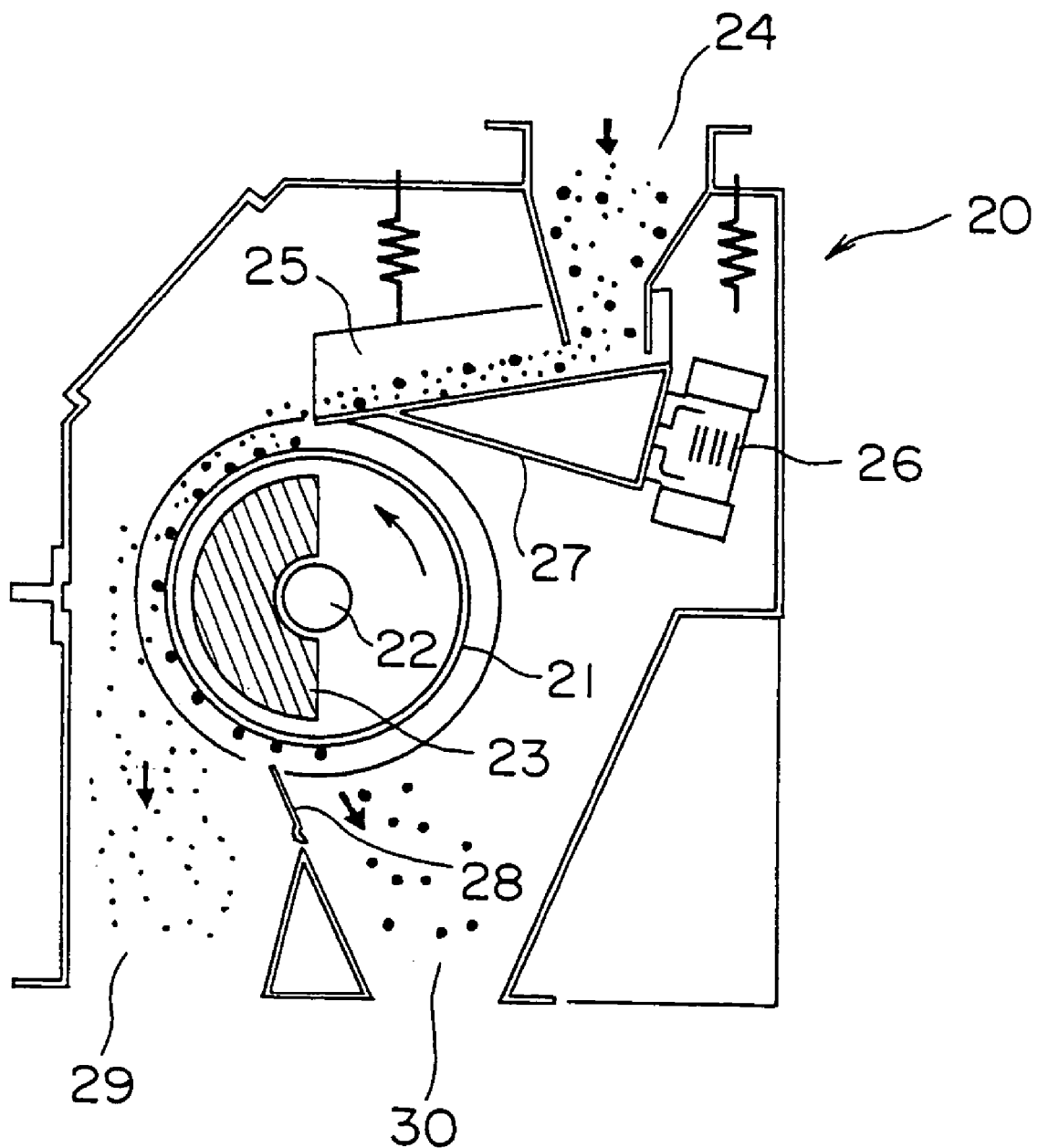
FIG. 4 is an explanatory view showing a construction of a magnetic separator used in the decladding device of FIG. 1.

Next, structure of the magnetic separator 20 will be described with reference to FIG. 4. In FIG. 4, numeral 21 designates a drum that is rotated around a rotating shaft 22. In the drum 21, a magnet 23 of a semi-circular cross sectional columnar shape is fitted and fixed. Numeral 24 designates a shredded fragment throwing port that receives fragments of the spent nuclear fuel pins shredded by the shredder 1.

Numeral 25 designates a shredded fragment falling chute. A vibration feeder 27 having a vibration generator 26 is fitted to the shredded fragment falling chute 25. The vibration feeder 27 gives vibration to the shredded fragment falling chute 25 so that the shredded fragments falling down from the shredded fragment throwing port 24 are uniformly dispersed on the shredded fragment falling chute 25 and fall down on the drum 21 in a dispersed state.

Numeral 28 designates a separating plate that is arranged below the drum 21. The separating plate 28 separates a space below the drum 21 into a non-magnetic substance outlet 29 and a magnetic substance outlet 30. That is, after the shredded fragments move along the surface of the drum 21, non-magnetic substances included therein fall down toward the non-magnetic substance outlet 29 drawing a parabolic locus. Further, magnetic substances included in the shredded fragments partly stick to the surface of the drum 21 by the magnetic force of the magnet 23 and, at the position where no magnet 23 exists, leave the surface of the drum 21 to fall down toward the magnetic substance outlet 30. Also, magnetic substances partly draw a locus different from the non-magnetic substances by the influence of the magnetism and fall down toward the magnetic substance outlet 30.

The decladding device of spent nuclear fuel of the present embodiment is constructed as mentioned above and its decladding function is as follows.

The spent nuclear fuel pins P of which clads are to be removed are thrown into the hopper 8 and are arrayed in a row on the supply passage 9 to be fed to the throwing mechanism 10. The throwing mechanism 10 provided on the supply passage 9 supplies the spent nuclear fuel pins P so that the spent nuclear fuel pins P fall down one by one or in a unit of several pins at a predetermined timing toward the blades 4, 5 of the shredder 1.

Thus, the spent nuclear fuel pins P that have fallen to be so supplied are finely shredded by the blades 4, 5 so that the main part of the shredded fragments is of a size of 1 to 2 mm or less. The shredded fragments generated by shredding by meshing portions of the blades 4, 5 pass through the holes of the screen 6 and fall down toward the shredded fragment throwing port 24 of the magnetic separator 20 provided below the shredder 1.

At this time, the shredded fragments larger than the diameter of the holes of the screen 6 are retained on the screen 6 and scraped up by claw tips of the blades 4, 5 to be repeatedly shredded. The shredded fragments smaller than the diameter of the holes of the screen 6 fall down on the shredded fragment throwing port 24 and are transferred on the shredded fragment falling chute 25 to fall down on the drum 21. At this time, the shredded fragment falling chute 25 is vibrated by the vibration feeder 27 comprising the vibration generator 26 so that the shredded fragments transferred on the shredded fragment falling chute 25 are uniformly dispersed and the shredded fragments fall down on the drum 21 in this dispersed state.

The shredded fragments of the fuel pins made of austenitic stainless steel are given a magnetic property by the shearing action by the shredder 1. Hence, the shredded fragments of the fuel pins are attracted by the magnetism of the magnet 23 so that they stick to the portion of the drum 21 that is rotating at the position where the magnet 23 is arranged.

On the other hand, the spent nuclear fuel separated from the fuel pins by the shredding of the spent nuclear fuel pins fall down toward the non-magnetic substance outlet 29 as they are without influence by the magnetism of the magnet 23.

The shredded fragments of the fuel pins, while they are being attracted by the magnetism of the magnet 23 to stick to the surface of the drum 21, move together with the rotation of the drum 21 as they are sticking to the surface of the drum 21. When they come to the position where no magnet 23 is arranged, the influence of the magnet 23 is eliminated and the shredded fragments of the fuel pins leave the surface of the drum 21 and fall down toward the magnetic substance outlet 30.

Also, the shredded fragments of the fuel pins having a relatively large particle size so as to be weakly magnetized to receive the influence of the magnetism, if not to stick to the surface of the drum 21, fall down toward the magnetic substance outlet 30 drawing a locus more approaching to the magnet 23 side than the parabolic line drawn by the non-magnetic substances.

In this way, the spent nuclear fuel pins are finely shredded by shearing so that there is caused a martensitic phenomenon in the shredded portion of the austenitic stainless steel and thereby the fragments of the fuel pins can be magnetically separated.

Second Embodiment

Figure 5:
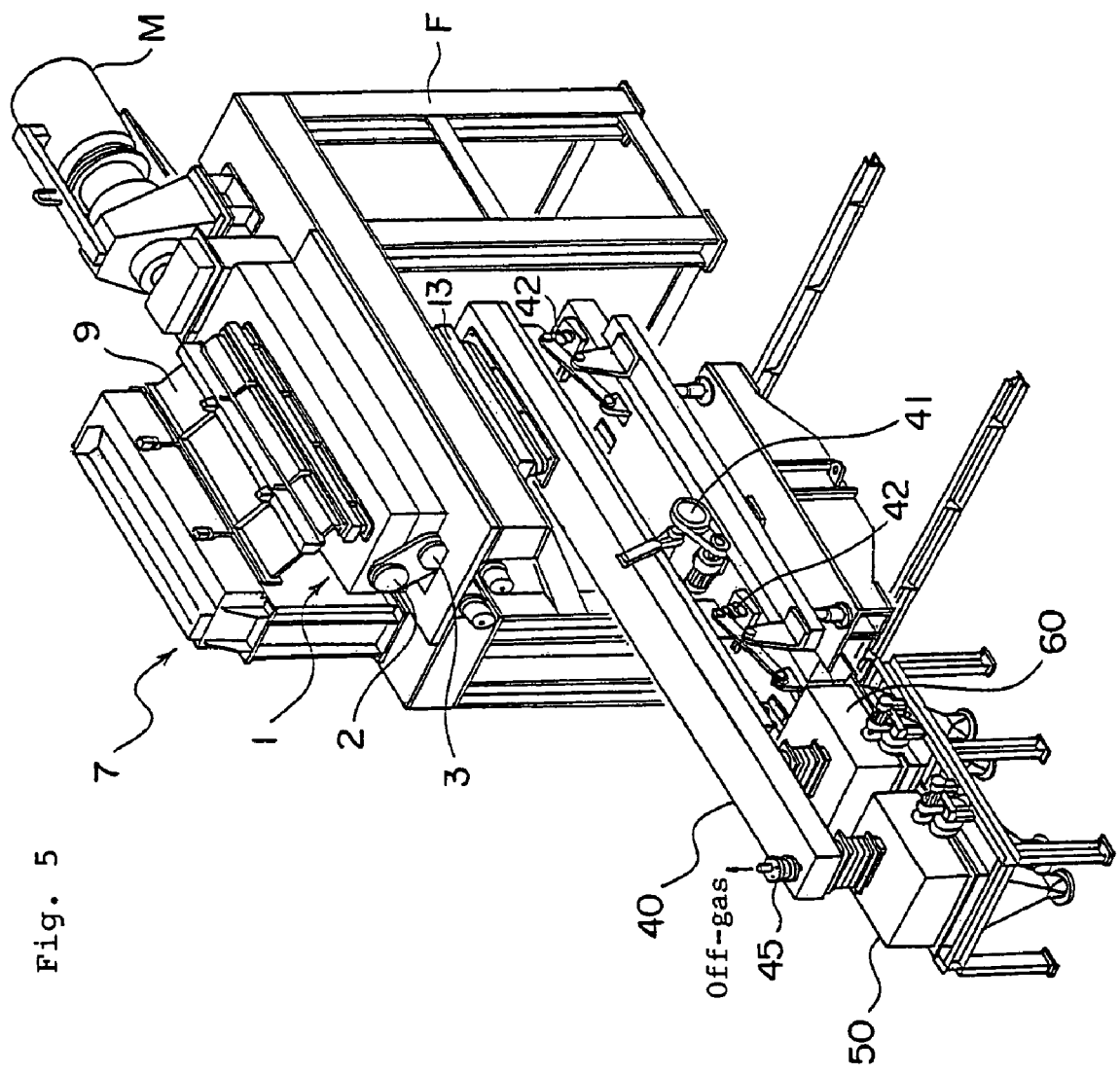
FIG. 5 is a perspective view showing an entire construction of a decladding device of spent nuclear fuel of a second embodiment according to the present invention.

Next, a second embodiment according to the present invention will be described with reference to FIG. 5. In FIG. 5, parts and components equivalent to those of the decladding device of spent nuclear fuel of the above-mentioned first embodiment are designated with the same reference numerals or letters as shown in FIGS. 1 to 4 and repeated description thereof will be omitted.

In FIG. 5, numeral 40 designates a shredded fragment conveyor and classifier that has its one end portion (on the right hand side of FIG. 5) constructed to receive the shredded fragments of the spent nuclear fuel pins P that have been shredded by the shredder 1 to fall down from the shredded fragment falling port 13 and to convey them toward the other end portion (on the left hand side of FIG. 5).

This shredded fragment conveyor and classifier 40 is elastically supported by a plurality (two pieces in FIG. 5) of springs 42.

Numeral 41 designates an eccentric shaft arrangement that constitutes a vibration generator. By the rotation of this eccentric shaft arrangement 41, the shredded fragment conveyor and classifier 40 is vibrated. In this state, the shredded fragments received in the shredded fragment conveyor and classifier 40 are conveyed as well as classified into a large particle size portion and a small particle size portion.

In this way, in the process of conveying by the shredded fragment conveyor and classifier 40, the shredded fragments are classified into the large particle size portion and the small particle size portion. Thereby, the shredded fragments of the large particle size are conveyed to a large particle size magnetic separator 50 and the shredded fragments of the small particle size to a small particle size magnetic separator 60. It is to be noted that numeral 45 designates a nozzle through which off-gas is discharged.

In the drum type magnetic separator, there is a tendency that, if the drum speed is increased, the fuel recovery rate (=mass of the fuel on the non-magnetic substance side/total mass of the fuel before separation) increases but reversely the fuel purity (=mass of the fuel on the non-magnetic substance side/total mass of the fuel on the non-magnetic substance side) decreases. Also, there is a tendency that, if the magnetic flux density on the surface of the drum is made higher, the fuel purity increases but the fuel recovery rate decreases.

The reason for the above is that, if the drum speed is increased, the inertia force of the shredded fragments on the surface of the drum becomes larger and thereby the shredded fuel fragments and the shredded metal fragments moving to the non-magnetic substance outlet in front of the drum increase. On the other hand, if the magnetic flux density on the surface of the drum is made higher, while the shredded metal fragments are easily recovered by the influence of the stronger magnetic field, the shredded fuel fragments are also caught therein.

As a tendency of the shredded metal fragments of the fuel pins, the smaller the particle size is, the higher the magnetizing rate, and the larger the particle size is, the lower the magnetizing rate. Hence, if the magnetic flux density is made higher in the magnetic separation of the shredded fragments of the small particle size, while mixing of the shredded metal fragments into the fuel side is suppressed because of the higher magnetizing rate of the shredded metal fragments and thereby a higher fuel purity can be obtained, the fuel is caught in the metal side and the fuel recovery rate decreases.

On the other hand, in the shredded fragments of the large particle size, if the magnetic flux density is low, while the shredded metal fragments easily mix into the fuel side and thereby the fuel purity decreases, the fuel is recovered more into the non-magnetic substance side and the fuel recovery rate increases.

Thus, in order to enhance the separation performance (fuel purity, separation efficiency), it is necessary that, for the shredded fragments of the small particle size, the magnetic flux density is made slightly lower and the drum speed is increased and also, for the shredded fragments of the large particle size, the magnetic flux density is made higher and the drum speed is made slightly lower.

Thus, in performing the magnetic separation after the shredding by using the decladding device of spent nuclear fuel of the present second embodiment shown in FIG. 5, the shredded fragments are first applied to the classifier and then applied to the magnetic separator, wherein two kinds of magnetic separators are used, that is, the small particle size magnetic separator 60 providing an effective operation condition for the separation of the shredded fragments of the small particle size and the large particle size magnetic separator 50 providing an effective operation condition for the separation of the shredded fragments of the large particle size. A highly efficient magnetic separation can thereby be achieved.

In the above, while the present invention has been described based on the embodiments, it is a matter of course that the present invention is not limited to these embodiments but may be added with variations and modifications within the scope of the claims of the present invention as appended herein.

For example, in the structure of the shredder 1, the shape or structure of the blades 4, 5 and the number of the blades 4, 5 can be arbitrarily selected.

Also, the type and structure of the magnetic separator 20 are not limited to the ones as illustrated but various types and structures of the magnetic separator can be employed. For example, a magnetic separator of a belt type can be employed other than the rotating drum type.

Also, the arrangement of the shredder 1 and the magnetic separator 20 is not necessarily limited to the one in which the shredder 1 is arranged above the magnetic separator 20 as in the above-described embodiments.

What is claimed is:

1. A decladding apparatus of spent nuclear fuel, comprising:
    a shearing device for shearing a plurality of spent nuclear fuel pins into shredded fragments, said shearing device comprising a rotary cutter having a plurality of blades on each of two rotating shafts that are arranged parallel to each other and to be rotated in reverse directions to each other, said blades being fitted on said two rotating shafts and assembled together so as to alternately fit between each other to be partially lapped on one another, and a screen for retaining the fragments until the fragments are finely sheared so that a main portion of the fragments are of a size of 2 mm or less;
    a classifier for classifying the shredded fragments from said shearing device into a large particle size portion and a small particle size portion; and
    a magnetic separator for magnetically separating the shredded fragments from said classifier, said magnetic separator comprising a small particle size separator for the separation of the small particle size portion of the shredded fragments and a large particle size separator for the separation of the large particle size portion of the shredded fragments.

2. The decladding apparatus of claim 1, wherein said magnetic separator is arranged below said shearing device.

3. The decladding device of claim 2, wherein said shearing device further comprises a feeder for feeding the spent nuclear fuel pins one by one or by a unit of several spent nuclear fuel pins.

4. The decladding device of claim 1, wherein said shearing device further comprises a feeder for feeding the spent nuclear fuel pins one by one or by a unit of several spent nuclear fuel pins.

5. The decladding device of claim 1, wherein said shearing device further comprises a feeder for feeding the spent nuclear fuel pins one by one or by a unit of several spent nuclear fuel pins.

6. A decladding apparatus of spent nuclear fuel, comprising:
    a shearing device for shearing a plurality of spent nuclear fuel pins into shredded fragments, said shearing device comprising a rotary cutter having a plurality of blades operable to shear the spent nuclear fuel pins and magnetize stainless steel portions thereof, and a screen for retaining the fragments until the fragments are finely sheared so that a main portion of the fragments are of a size of 2 mm or less;
    a classifier for classifying the shredded fragments from said shearing device into a large particle size portion and a small particle size portion; and
    a magnetic separator for magnetically separating the shredded fragments from said classifier, said magnetic separator comprising a small particle size separator for the separation of the small particle size portion of the shredded fragments and a large particle size separator for the separation of the large particle size portion of the shredded fragments.

7. The decladding apparatus of claim 6, wherein said magnetic separator is arranged below said shearing device.

8. The decladding device of claim 6, wherein said shearing device further comprises a feeder for feeding the spent nuclear fuel pins one by one or by a unit of several spent nuclear fuel pins.

* * * * *